US009166492B2

(12) United States Patent
Yamamoto et al.

(10) Patent No.: US 9,166,492 B2
(45) Date of Patent: Oct. 20, 2015

(54) MULTILEVEL VOLTAGE SOURCE CONVERTER AND METHOD FOR BALANCING CAPACITORS

(71) Applicant: Hitachi, Ltd., Chiyoda-ku, Tokyo (JP)

(72) Inventors: Takayoshi Yamamoto, Mito (JP); Masaya Ichinose, Hitachiota (JP); Akira Bando, Hitachi (JP); Shigenori Inoue, Hitachi (JP); Toru Yoshihara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 134 days.

(21) Appl. No.: 13/938,996

(22) Filed: Jul. 10, 2013

(65) Prior Publication Data
US 2014/0016379 A1    Jan. 16, 2014

(30) Foreign Application Priority Data

Jul. 11, 2012    (JP) .................................. 2012-155209

(51) Int. Cl.
*H02M 7/217*    (2006.01)
*H02M 5/44*    (2006.01)
*H02M 7/483*    (2007.01)

(52) U.S. Cl.
CPC ............... *H02M 5/44* (2013.01); *H02M 7/483* (2013.01); *H02M 2007/4835* (2013.01)

(58) Field of Classification Search
CPC ..... H02M 3/24; H02M 7/5387; H02M 7/515; H02M 2001/124; H02M 1/126
USPC ............................................... 363/37, 371, 41
See application file for complete search history.

(56) References Cited

U.S. PATENT DOCUMENTS

| 3,875,496 | A | * | 4/1975 | Carsten ........................... 363/97 |
| 5,625,545 | A | * | 4/1997 | Hammond ....................... 363/71 |
| 5,703,748 | A | * | 12/1997 | Fulks et al. .................... 361/153 |
| 8,279,644 | B2 | * | 10/2012 | Zhang et al. .................... 363/55 |
| 8,390,259 | B2 | * | 3/2013 | Dommaschk et al. ......... 320/166 |
| 8,711,586 | B2 |   | 4/2014 | Yamada et al. |

FOREIGN PATENT DOCUMENTS

| JP | 63-174590 A | 7/1988 |
| JP | 2002-101684 A | 4/2002 |
| JP | 2010-233411 A | 10/2010 |
| JP | 2011-24390 A | 2/2011 |

OTHER PUBLICATIONS

Japanese Office Action dated Oct. 14, 2014 with partial English-language translation (Three (3) pages).

* cited by examiner

*Primary Examiner* — Harry Behm
*Assistant Examiner* — Peter Novak
(74) *Attorney, Agent, or Firm* — Crowell & Moring LLP

(57) ABSTRACT

A control apparatus for use with a voltage source converter includes legs, each of which is configured by a plurality of converter modules each having a capacitor. Each of the legs has a first terminal on a positive side and a second terminal on a negative side. The control apparatus is configured to create command pulses for operating the converter modules. The command pulses have a frequency that is a non-integer multiple of a frequency of a system voltage. The non-integer multiple may be, for example, 3.5.

17 Claims, 10 Drawing Sheets

MULTILEVEL VOLTAGE SOURCE CONVERTER AND METHOD FOR BALANCING CAPACITORS

BACKGROUND OF THE INVENTION

The present invention relates to an apparatus and method for controlling a voltage source converter.

In recent years, many power converters for converting alternating current to direct current or vice versa have been used. Power converters of this type are also applied to the field of high voltages. In such an application, converter modules each including semiconductor switching devices, for example, are utilized. That is, such converter modules are connected in series. This configuration can withstand high voltages.

In such a configuration, converter modules are connected, for example, in series to constitute legs. In each leg, electrical current is controlled by controlling the operation of each converter module. Thus, power conversion is achieved between the AC terminal and the DC terminal.

Generally, in the field of electric power conversion, plural phases are often treated. Therefore, the joint in each leg is taken as an AC terminal. On the other hand, the DC terminals of the legs are interconnected.

In this configuration, electric power conversion is made between DC and AC terminals while treating plural phases by providing control such that a periodic electric current flows, the current being determined by the reciprocal of the frequency of the AC system to which the AC terminals are connected.

Such a technique is described, for example, in JP-A-2010-233411.

SUMMARY OF THE INVENTION

In controlling the above-described power converters, a PWM technique is often used. In this PWM technique, a given voltage is output by varying the time ratio during which the switching device is ON. To realize it, a carrier wave is generated inside a controller, and the switching device is so operated that the voltage stored in a capacitor is delivered by a converter module when the commanded output voltage is greater than the voltage of the carrier wave and that, when the commanded output voltage is smaller than the voltage of the carrier wave, the voltage across the converter module is 0 V. For example, a triangular wave whose maximum value represents the voltage stored in the capacitor and whose minimum value represents 0 V is used as the carrier wave.

However, it has been necessary to prevent accumulation of voltage in the capacitor or continual release of voltage from the capacitor when the frequency of the triangular wave is equal to an integer multiple (especially, a small value such as 3) of the frequency of the system voltage.

From the foregoing, it is an object of the present invention to provide an apparatus and method for controlling a voltage source converter with a simpler configuration than heretofore such that the foregoing problem can be alleviated.

To achieve the object of the invention, according to the present invention, command pulses have a frequency that is a non-integer multiple of a frequency of a system voltage. For example, the non-integer multiple is 3.5.

According to the present invention, the power converter is simple in structure but is capable of suppressing the DC component of an electrical current flowing through each capacitor and of preventing accumulation of voltage in the capacitors or continual release of voltage from the capacitors.

Other objects, features and advantages of the invention will become apparent from the following description of the embodiments of the invention taken in conjunction with the accompanying drawings.

MODES FOR CARRYING OUT THE INVENTION

Figure 1:
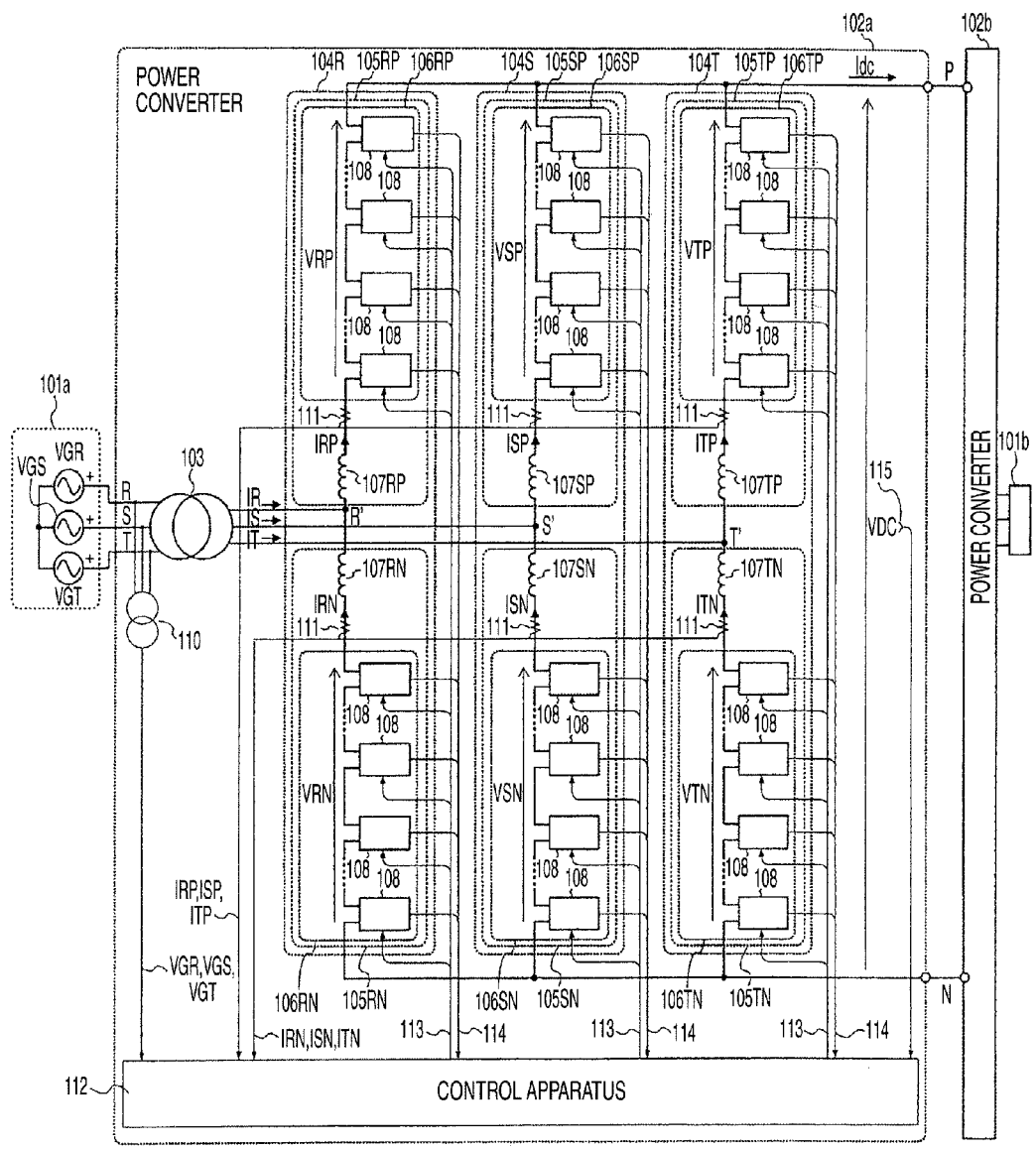
FIG. 1 is a diagram showing the configuration of a voltage source converter.

Modes for carrying out the present invention are hereinafter described with reference to the drawings.

Embodiments

In a voltage source converter associated with one embodiment of the present invention, each arm is made up of a plurality of converter modules.

The configuration of the voltage source converter associated with the present embodiment is described below by referring to FIG. 1. Then, the operating principle of the present invention and schematic waveforms will be described.

The manner in which a power converter 102a is connected with an external circuit is first described.

The power converter 102a is connected with an AC (alternating current) grid 101a via a transformer 103. In the present embodiment, the AC grid (101a) side of the transformer 103 is taken as a primary side, while the power converter side of the transformer 103 is taken as a secondary side. The various phases of the transformer 103 are referred to as R-phase, S-phase, and T-phase.

The power converter 102a has DC terminal points P and N which are connected with DC terminal points P and N, respectively, of another power converter 102b. It is assumed that the DC terminal point P is at a higher potential than the DC terminal point N. The power converter 102b is identical in configuration with the power converter 102a and connected with an AC grid 101b and so its detail description is omitted.

In the embodiment of FIG. 1, the power converters 102a and 102b together constitute a direct current transmission system. A motor driving system can be built using the power converter 102a.

The internal configuration of the power converter 102a is described below.

The power converter 102a is made up of the transformer 103, a converter section, and a controller. The converter section is composed of an R-phase leg 104R, an S-phase leg 104S, and a T-phase leg 104T. The controller is composed of voltage sensors 110, 115, current sensors 111, a control apparatus 112, gate signal lines 113, and capacitor voltage detection lines 114.

The converter section is first described. The R-phase leg 104R of the converter section is a series combination of an RP arm 105RP and an RN arm 105RN. The joint of the RP arm 105RP and the RN arm 105RN is connected to the R-phase of the transformer 103. The terminal of the RP arm 105RP which is on the opposite side of the terminal connected to the RN arm 105RN is connected to the DC terminal point P. The terminal of the RN arm 105RN which is on the opposite side of the terminal connected to the RP arm 105RP is connected with the DC terminal point N.

Similarly to the R-phase leg, the S-phase leg 104S is a series combination of an SP arm 105SP and an SN arm 105SN. The joint of the SP arm 105SP and the SN arm 105SN is connected to the S-phase of the transformer 103. The terminal of the SP arm 105SP which is on the opposite side of the terminal connected to the SN arm 105SN is connected with the DC terminal point P. The terminal of the SN arm 105SN which is on the opposite side of the terminal connected to the SP arm 105SP is connected with the DC terminal point N.

Similarly to the R-phase leg, the T-phase leg 104T is a series combination of a TP arm 105TP and a TN arm 105TN. The joint of the TP arm 105TP and the TN arm 105TN is connected to the T-phase of the transformer 103. The terminal of the TP arm 105TP which is on the opposite side of the terminal connected to the TN arm 105TN is connected with the DC terminal point P. The terminal of the TN arm 105TN which is on the opposite side of the terminal connected to the TP arm 105TP is connected with the DC terminal point N.

As is obvious from the description provided so far, two symbols are attached to each arm 105. The left symbol indicates a leg to which this arm belongs. The right symbol denotes the polarity of the DC terminal to which this arm is connected. In the following description of the present invention, symbols are attached everywhere based on the same rules but any repetitive explanation thereof will be omitted.

The internal configuration of each arm is next described.

The RP arm 105RP is formed by connecting a bidirectional chopper set 106RP in series with a first reactor 107RP. The chopper set 106RP is formed by connecting M bidirectional chopper converter modules 108 in series. The output voltage from the bidirectional chopper set 106RP is referred to as VRP.

The RN arm 105RN is formed by connecting a bidirectional chopper set 106RN in series with a second reactor 107RN. The chopper set 106RN is formed by connecting M bidirectional chopper converter modules 108 in series. The output voltage from the bidirectional chopper set 106RN is referred to as VRN.

The SP arm 105SP is formed by connecting a bidirectional chopper set 106SP in series with a first reactor 1075P. The chopper set 106SP is formed by connecting M bidirectional chopper converter modules 108 in series. The output voltage from the bidirectional chopper set 106SP is referred to as VSP.

The SN arm 105SN is formed by connecting a bidirectional chopper set 106SN in series with a second reactor 107SN. The chopper set 106SN is formed by connecting M bidirectional chopper converter modules 108 in series. The output voltage from the bidirectional chopper set 106SN is referred to as VSN.

The TP arm 105TP is formed by connecting a bidirectional chopper set 106TP in series with a first reactor 107TP. The chopper set 106TP is formed by connecting M bidirectional chopper converter modules 108 in series. The output voltage from the bidirectional chopper set 106TP is referred to as VTP.

The TN arm 105TN is formed by connecting a bidirectional chopper set 106TN in series with a second reactor 107TN. The chopper set 106TN is formed by connecting M bidirectional chopper converter modules 108 in series. The output voltage from the bidirectional chopper set 106TN is referred to as VTN.

Although the description of the converter section is not yet complete, we proceed to a description of the control apparatus for the sake of illustration. The configuration of the control apparatus is described. The arms 105RP, 105SP, 105TP, 105RN, 105SN, and 105TN are equipped with their respective current sensors 111 for detecting electrical currents IRP, ISP, ITP, IRN, ISN, and ITN (also referred to as arm currents herein) flowing through the arms, respectively. The results of the detections are transmitted to the control apparatus 112. Each arm current flows from the DC terminal point N to the DC terminal point P. This direction is defined as the positive direction.

The voltage sensor 110 is connected with the R-phase, S-phase, and T-phase of the transformer 103 and has the same winding structure as the winding of the transformer 103. Thus, the sensor 110 detects voltages VGR, VGS, and VGT in the same phase as the secondary side of the transformer. The voltage sensor 110 accepts the system voltages VGR, VGS, and VGT, and sends the results of detection to the control apparatus 112.

The control apparatus 112 accepts a capacitor voltage VCjk delivered from a converter module 108 (described later in connection with FIG. 2). Also, the control apparatus accepts a DC voltage VDC from the DC voltage detector 115.

The control apparatus 112 accepts the AC voltages VGR, VGS, VGT, the arm currents IRP, ISP, ITP, IRN, ISN, and ITN, and the capacitor voltage VCjk delivered from the converter module 108, and routes gate signals GHjk and GLjk to the bidirectional chopper converter modules 108 via the gate signal lines 113.

Symbol "j" indicates the arms RP, SP, TP, RN, SN, and TN. k=1, 2, . . . , M indicates plural converter modules 108 within each arm. The gate signal GHjk is used to drive high-side switching devices (described later). The gate signal GLjk is used to drive low-side switching devices (described later).

We return to the description of the converter section. The internal configuration of each bidirectional chopper converter module 108 is described next by referring to FIG. 2. The RP arm 105RP is described as a representative of the plural arms. The other arms 105SP, 105TP, 105RN, 105SN, and 105TN are identical in configuration and so their description is omitted.

Each bidirectional chopper converter module 108 has a main circuit that is formed by connecting a parallel circuit of a high-side switching device 201H and a high-side free-wheeling diode 202H in series with a parallel circuit of a low-side switching device 201L and a low-side free-wheeling diode 202L and connecting this series combination in parallel with a capacitor 203.

The diodes 202H and 202L are connected in series in a direction where no current flows regarding the capacitor voltages VCjk (j=RP, SP, TP, RN, SN, TN; k=1, 2, . . . , M). The switching devices 201H and 201L connected in parallel with the diodes 202H and 202L are so oriented that when conducting (ON state), they discharge the capacitor voltages VCjk. A device (indicated by symbol H) placed at a higher capacitor voltage is herein referred to as a high-side device. The reverse (indicated by symbol L) is referred to as a low-side device.

A voltage Vjk is applied to a parallel circuit of the low-side switching device 201L and the low-side free-wheeling diode 202L. This voltage Vjk is referred to as the output voltage from each bidirectional chopper converter module 108.

Figure 2:
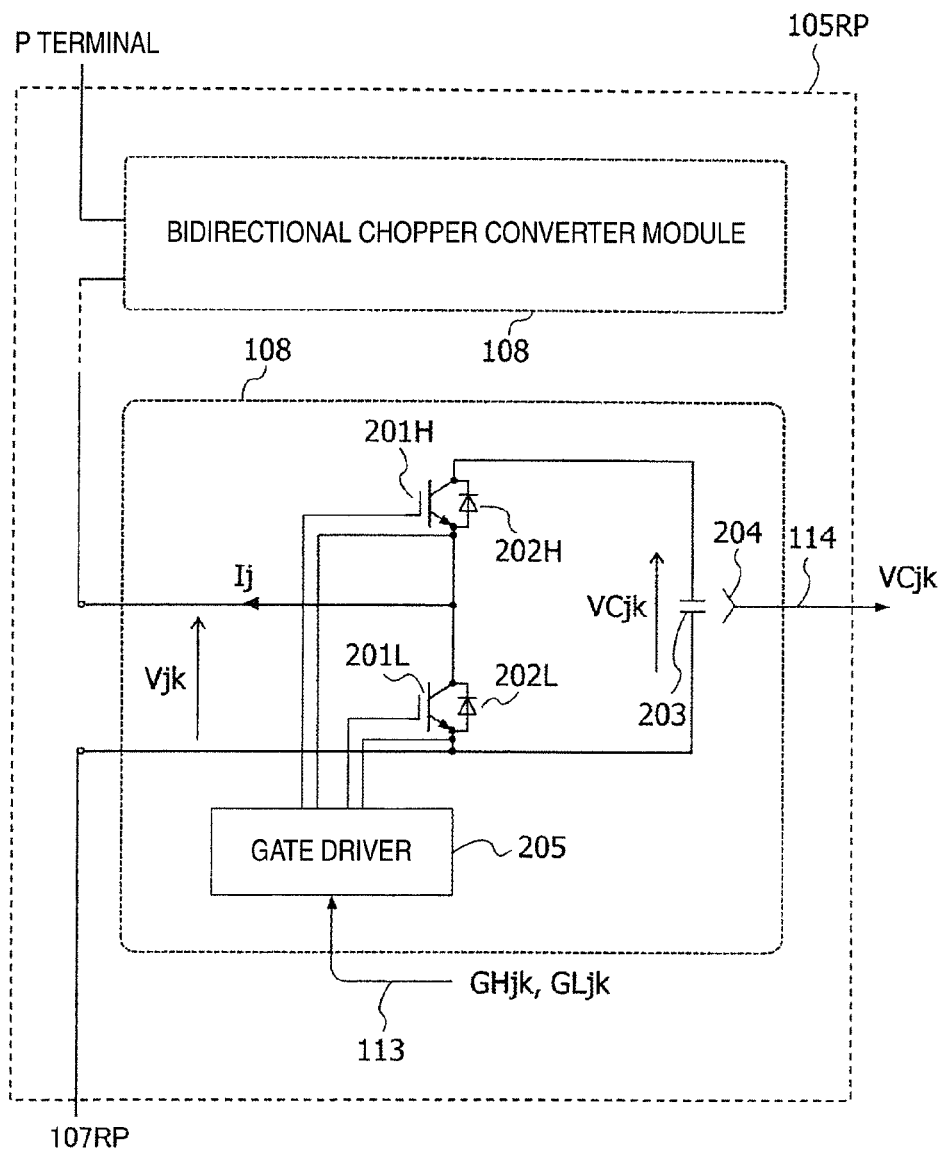
FIG. 2 is a diagram showing the internal configuration of one bidirectional chopper converter module.

In FIG. 2, symbol IGBT is used for the switching devices 201H and 201L. MOSFETs, GCTs, GTOs, and other control devices which are turned on and off can be used as the switching devices 201H and 201L.

Each bidirectional chopper converter module 108 is equipped with a voltage sensor 204 for detecting the capacitor voltage VCjk (j=RP, SP, TP, RN, SN, TN; k=1, 2, ..., M). This sensor 204 is connected with the control apparatus 112 via the capacitor voltage detection line 114.

Each bidirectional chopper converter module 108 has a gate driver 205 for applying a gate voltage between the gate and emitter of each of the switching devices 201H and 201L, based on gate signals GHjk and GLjk transmitted from the control apparatus 112 via the gate signal line 113.

The relationship among the output voltage Vjk from each bidirectional chopper converter module 108 and the states (ON or OFF) of the switching devices 201H and 201L is described below.

When the high-side switching device 201H is ON and the low-side switching device 201L is OFF, the output voltage Vjk is substantially equal to the capacitor voltage VCjk, irrespective of the currents Ij (j=RP, SP, TP, RN, SN, and TN) of the converter modules 108.

When the high-side switching device 201H is OFF and the low-side switching device 201L is ON, the output voltage Vjk is nearly equal to 0 irrespective of the currents Ij.

Figure 3:
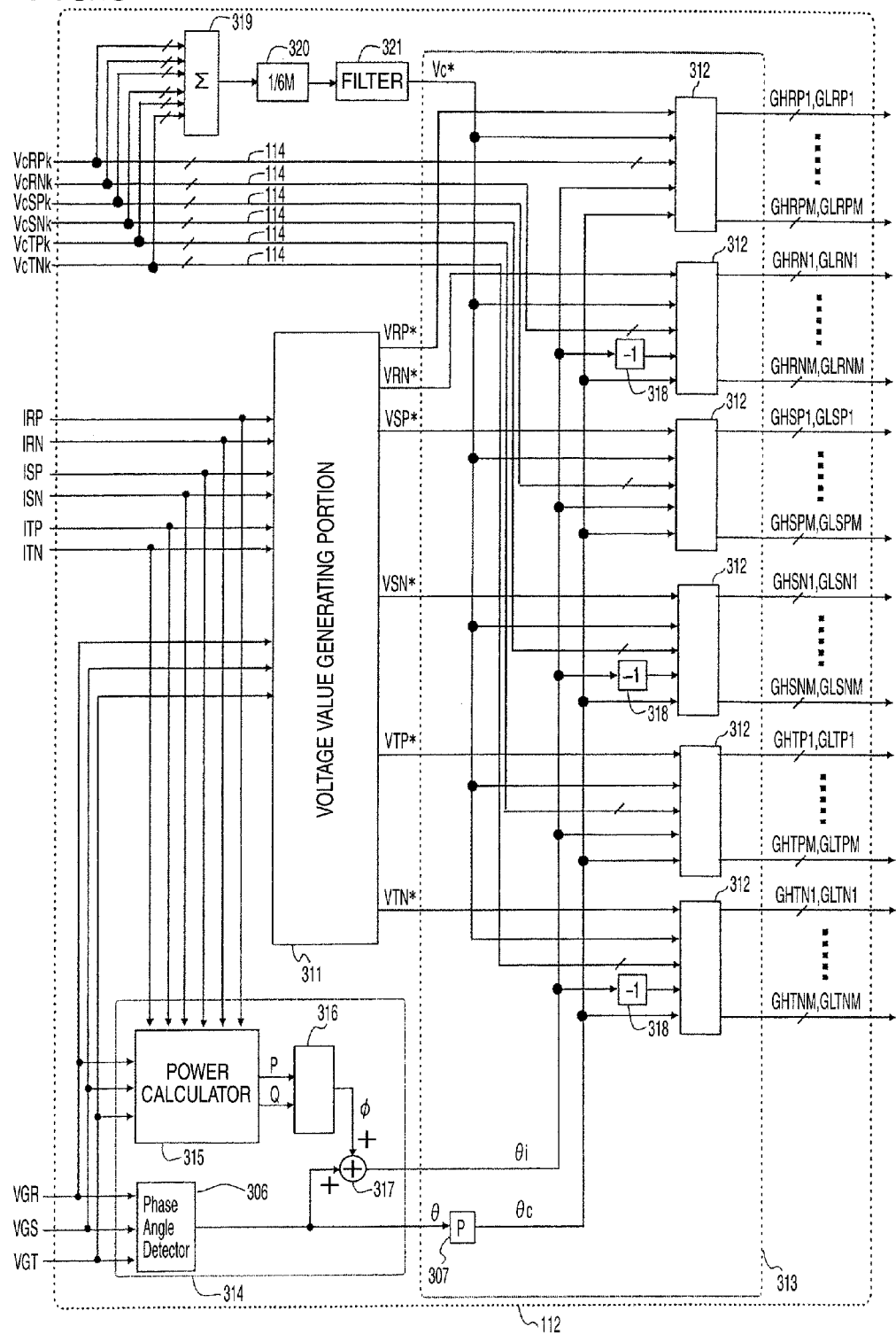
FIG. 3 is a diagram illustrating control exercised inside a control apparatus.

Control provided inside the control apparatus 112 is next described by referring to FIG. 3. In the present embodiment, it is assumed that the winding ratio of the transformer 103 is 1:1.

FIG. 3 shows a commanded arm voltage value (or an arm voltage reference-value) generating portion 311 for generating a commanded arm voltage given to the power converter 102a, a phase detection portion 314 for detecting the phases of an AC voltage and arm currents, and a commanded value distributing portion 313 for distributing commanded arm voltage values to the converter modules 108. The operation of the commanded arm voltage value generating portion 311 is first described.

The commanded arm voltage value generating portion 311 has a power controlling function of maintaining constant electric power supplied from the AC grid 101a into the power converter 102a, a current controlling function of controlling the currents Ij (j=RP, SP, TP, RN, SN, and TN) flowing through the arms 105j, and a function of generating a commanded arm voltage value for realizing the former two controlling functions.

These controlling functions incorporated in the commanded arm voltage value generating portion 311 exemplify controlling functions needed when a direct current transmission system is constituted. Obviously, in order to constitute a motor control system, for example, a speed controlling function, a current controlling function, and other functions are incorporated.

Commanded arm voltage values are calculated by the commanded arm voltage value generating portion 311 using commanded voltages VR*, VS*, VT* [V] for the phases and Eqs. (1)-(6) and are output in the form of ratio of arm voltage to DC voltage VDC* [V].

$$VRP^* = -\frac{VR^*}{VDC^*} + \frac{1}{2} \tag{1}$$

$$VRN^* = +\frac{VR^*}{VDC^*} + \frac{1}{2} \tag{2}$$

$$VSP^* = -\frac{VS^*}{VDC^*} + \frac{1}{2} \tag{3}$$

$$VSN^* = +\frac{VS^*}{VDC^*} + \frac{1}{2} \tag{4}$$

$$VTP^* = -\frac{VT^*}{VDC^*} + \frac{1}{2} \tag{5}$$

$$VTN^* = +\frac{VT^*}{VDC^*} + \frac{1}{2} \tag{6}$$

The operation of the phase detection portion 314 is next described.

First, a phase detector 306 detects a phase angle θ from the voltages VGR, VGS, and VGT in the AC grid.

A power calculator 315 on the AC side computes an active power P [W] and a reactive power Q [var] from the arm currents IRP, IRN, ISP, ISN, ITP, ITN and the voltages VGR, VGS, VGT in the AC grid. A power factor angle calculator 316 computes a power factor angle φ using the active power P and reactive power Q.

The phase detector 306 outputs a voltage phase angle θ of the AC grid. An adder circuit 317 outputs a current phase angle θi. θi is calculated from Eq. (7) using the voltage phase angle θ and power factor angle φ of the AC grid.

$$\theta i = \theta + \phi \tag{7}$$

Finally, the operation of the gate pulse generating portions 312 is described.

A carrier phase generator 307 multiplies each phase θ by the number of pulses p. Letting f be the frequency of the AC grid, the phase θc has a period of 1/(f×p) in seconds. In the present invention, the number of pulses p is selected to be a non-integer, e.g., 3.5.

Gate pulse generating portions 312 for the arms 105j (j=RP, SP, TP, RN, SN, and TN) enter commanded voltage values Vj* for the bidirectional chopper set 106j, commanded cell voltage values Vc*, voltages Vcjk (k=1, 2, ..., M) stored in the capacitors 203 of the M bidirectional chopper converter modules 108jk included in the bidirectional chopper set 106j, current phase angles ±θi (θi for the upper arms and −θi for the lower arms), and the carrier phase θc, and generates gate signals GHjk and GLjk that control the output voltages from the converter modules 108jk. There is one gate pulse generating portion 312 for each arm.

In FIG. 3, the commanded voltage values Vj* for the bidirectional chopper set 106j are obtained from the commanded arm voltage value generating portion 311. The commanded cell voltage values Vc* are derived from a filter 321. The commanded cell voltage values Vc* are calculated as average values of the capacitor voltages of all the chopper converter modules 108jk. For this purpose, the adder circuit 319, a coefficient circuit 320, and the filter 321 are used. Multiplier circuits 318 are used to multiply −1.

Figure 10:
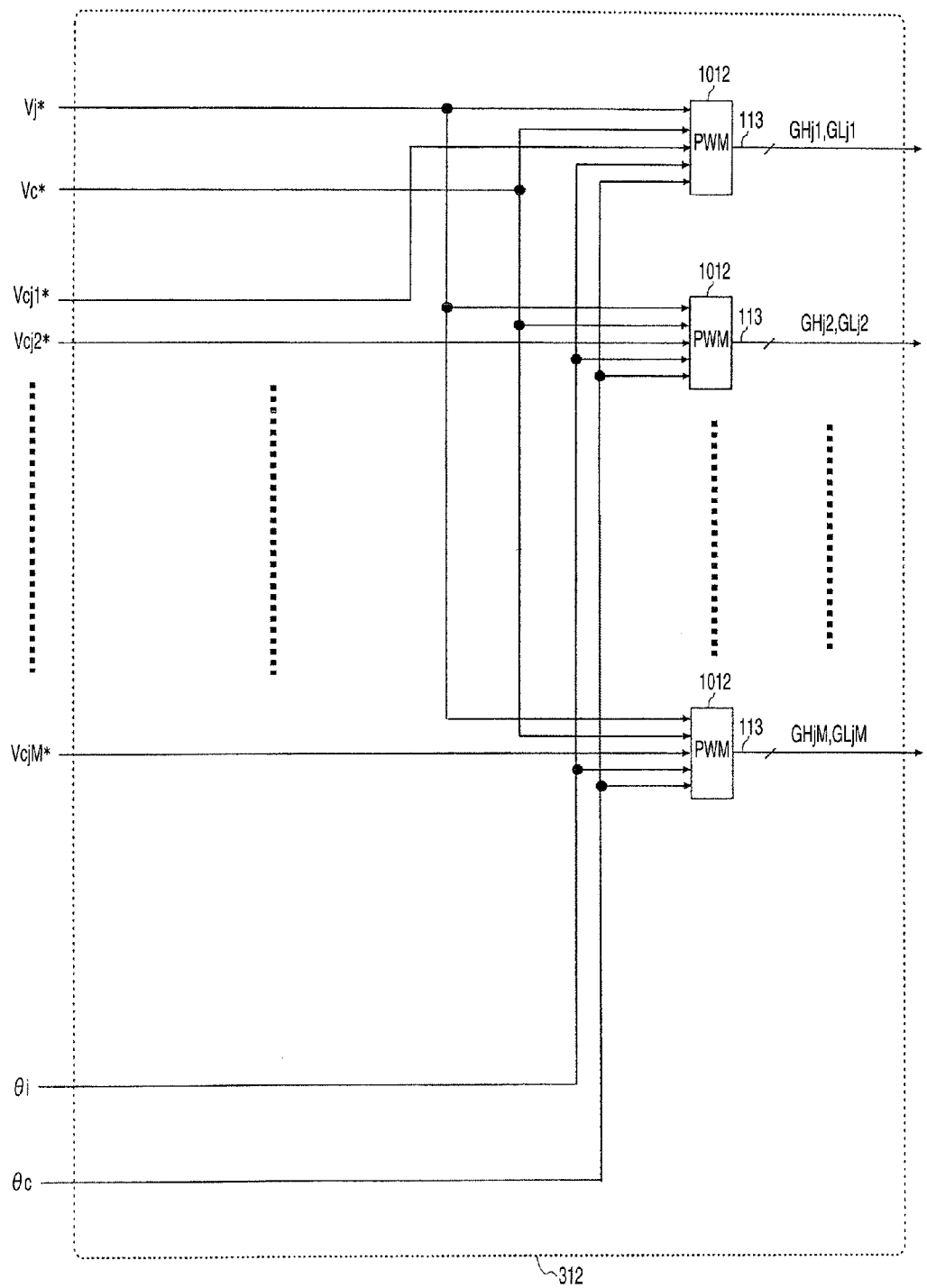
FIG. 10 is a diagram showing the internal configuration of one gate pulse generating portion for arms.

The internal configuration of the gate pulse generating portion 312 for the arms is described below by referring to FIG. 10.

Inputs to the gate pulse generating portion 312 are distributed to gate pulse generating portions 1012 for the cells 108jk (j=RP, SP, TP, RN, SN, TN; k=1, 2, ..., M).

The gate pulse generating portions 1012 for the cells 108jk generate gate signals GHjk and GLjk that control the output voltages from the M bidirectional chopper converter modules 108jk contained in the bidirectional chopper set 106j using a pulse-width modulation (PWM) technique such that the commanded voltage values Vj* and the output voltages Vj from the bidirectional chopper set 106RP agree as close as possible. There is one gate pulse generating portion 1012 in each cell (bidirectional chopper converter module 108jk).

Figure 4:
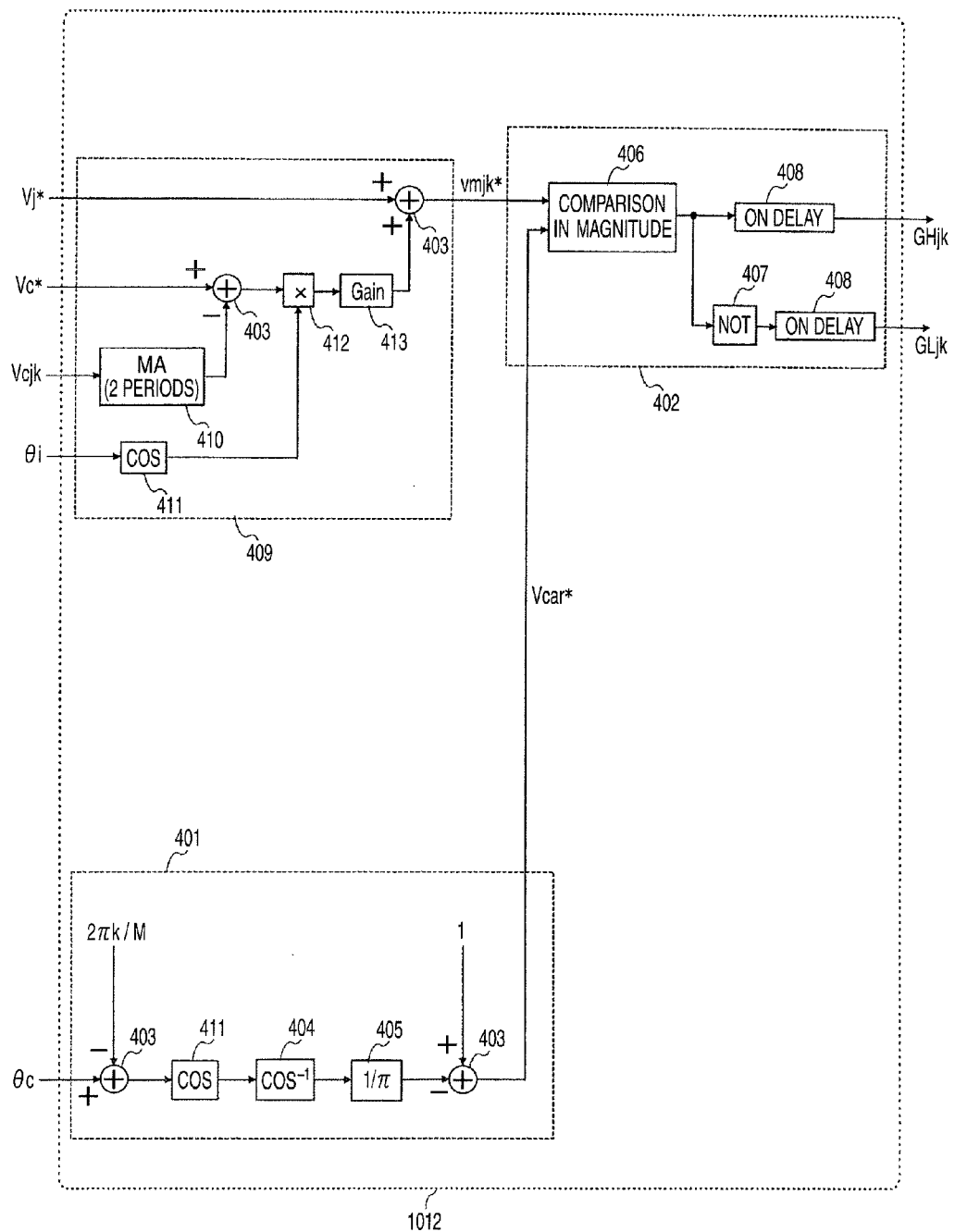
FIG. 4 is a diagram showing the internal configuration of each gate pulse generating portion for cells.

The internal configuration of each gate pulse generating portion 1012 for the cells is next described by referring to FIG. 4.

Each gate pulse generating portion 1012 has a carrier phase (triangular wave) generator 401, a modulating wave generator 409, and a gate pulse generator 402 for each cell.

The carrier phase generator 401 generates a triangular wave corresponding to phase θc. The phase of the triangular wave is shifted for each cell. For example, for the kth cell of the arm in the M stage, the wave is generated by the method defined by Eq. (8). At this time, the period of triangular wave Vcar* is the same as the period of phase θc, 1/(f×p) [s].

$$Vcar^* = 1 - \frac{1}{\pi}\cos^{-1}\left(\cos\left(\theta c - \frac{2\pi}{M}k\right)\right) \quad (8)$$

In Eq. (8), $\cos^{-1}$ is defined to assume values from 0 to π.

The triangular wave Vcar* generated as defined in Eq. (8) assumes a value of 1 at phase 2πk/M and a value of 0 at phase (2πk/M)+π. Within one arm, the carriers for the cells are successively shifted in phase by 2π/M.

A specific circuit configuration for generating a triangular wave is shown in the carrier phase (triangular wave) generator 401 of FIG. 4. Shown in the circuit configuration are a subtractor circuit 403, function circuits 411, 404, and a coefficient circuit 405.

The modulating wave generator 409 first performs a moving average 410 of the capacitor voltages Vcjk, thus calculating the average value VcjkMA of the capacitor voltages. The time increment of moving average is determined by the reciprocal of the greatest common divisor of the system frequency f and p×f (e.g., when p=3.5, the period of the reciprocal of 0.5f, i.e., twice of the period of the system voltage). Using this, modulating wave, Vmjk, is output according to Eq. (9).

$$v_{mjk}^* [pu] = v_j^* + \text{Gain}(Vc^* - V_{cjkMA}) \cdot \cos\theta_i \quad (9)$$

The second term of the right-hand side of Eq. (9) is a correction term for reducing the average value of the capacitor voltages and the capacitor voltage of its own cell. To create the correction term according to the sign of the current, the current phase θi is used. For instance, gain 413 is made of a proportional gain.

A specific circuit configuration for generation of a modulating wave is shown in the modulating wave generator 409 of FIG. 4. Shown in the circuit configuration are a subtractor or adder circuit 403, an MA circuit 410, a multiplier circuit 412, and a coefficient circuit 413.

The gate pulse generator 402 compares modulating wave Vmjk* [pu] and carrier signal Vcar* [pu]. As described previously, j=RP, SP, TP, RN, SN, and TN.

When Vmjk*>Vcar*, the gate pulse generator 402 activates (turns ON) the gate signal GHjk and deactivates (turns OFF) the gate signal GLjk such that the cell delivers a capacitor voltage.

When Vmjk*<Vcar*, the gate pulse generator 402 deactivates (turns OFF) the gate signal GHjk and activates (turns ON) the gate signal GLjk such that the cell delivers no capacitor voltage.

At this time, a gate signal is output via an ON delay 408 when the gate signals GHjk and GLjk are created such that the devices 201H and 201L are not turned on at the same time.

The configuration of the power converter 102a associated with the present invention and a method of controlling it have been described so far. In brief, in comparing a carrier signal and a commanded voltage using pulse-width modulation (PWM) technique, the gate pulse generating portion 312 of the present invention sets the frequency of the carrier signal to 3.5 times the frequency of the commanded voltage. In the past, the former frequency has been set to an integer multiple of the latter frequency. Therefore, where the multiple is 3, for example, a carrier signal of three periods is generated within one period of a commanded voltage and both are compared. In the present invention, a carrier signal of 7 periods is generated within 2 periods of a commanded voltage, and both are compared.

The advantageous effects obtained by the present embodiment that has selected such a frequency relationship and its mechanism are next described.

Figure 5:
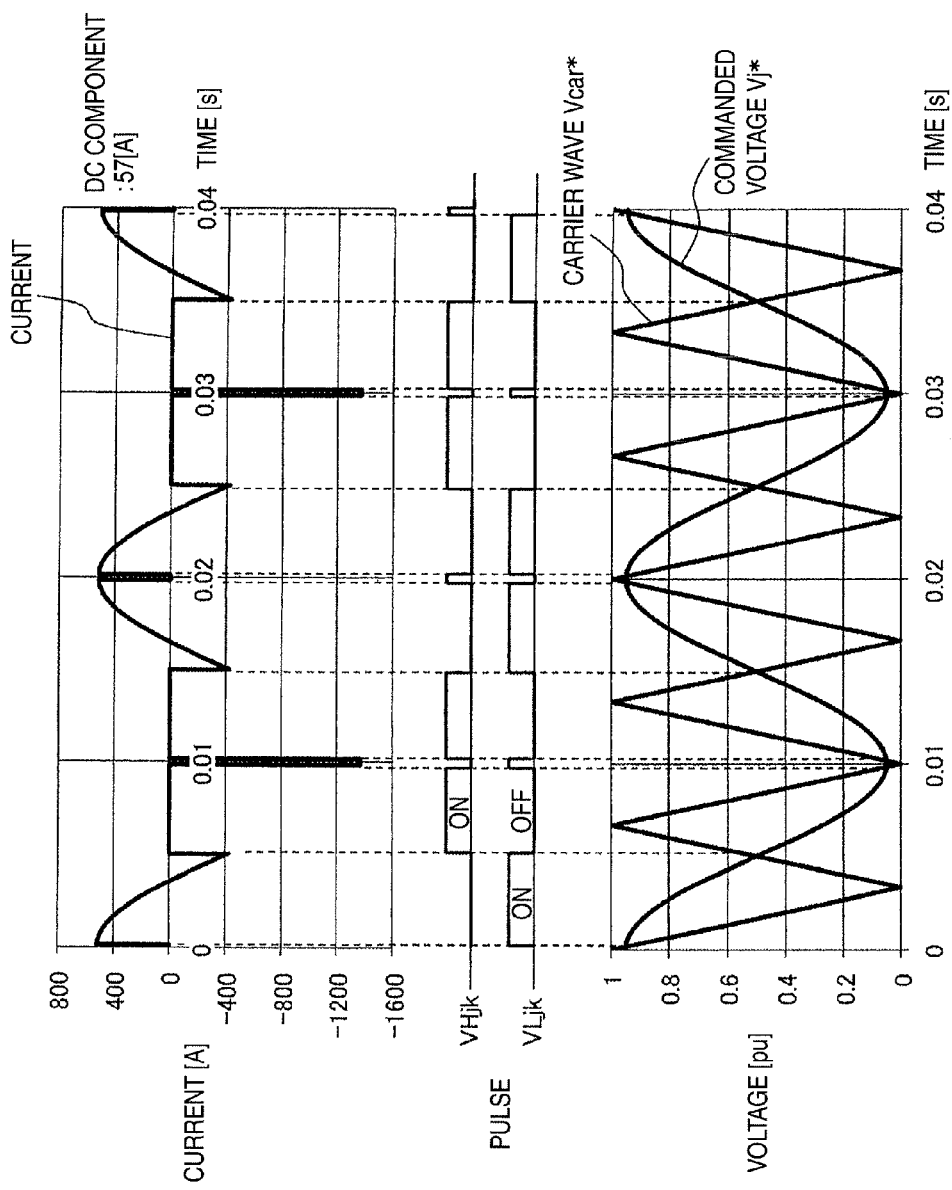
FIG. 5 is a diagram of current waveforms through the capacitor in a cell located in the 100th stage of a lower arm for R-phase when 3 pulses are produced.
Figure 8:
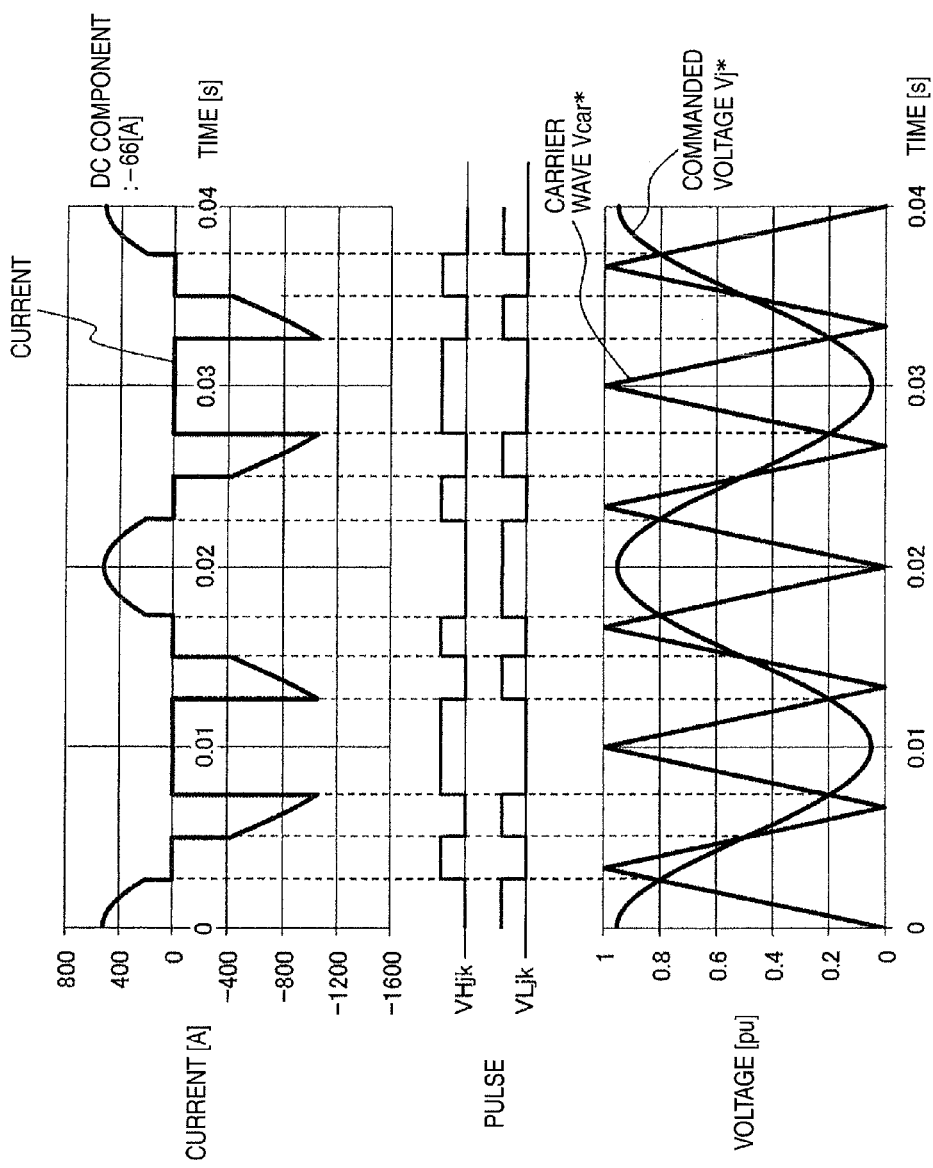
FIG. 8 is a diagram of current waveforms through the capacitor in the cell located in the 50th stage of the lower arm for R-phase when 3 pulses are produced.

In the conventional 2-level converter, an integer multiple (e.g., 3) of the system frequency f has been selected as the number of pulses p, and synchronization with the system frequency f has been taken. As one example, carrier arm voltage waveform (upper stage), pulse waveform (middle stage), and waveforms of capacitor current and its DC component (lower stage) are shown in FIGS. 5 and 8 where 1 arm is made of 100 converter modules and the number of pulses p is three (p=3). FIG. 5 shows the converter module in the 100th stage. FIG. 8 shows the waveforms at various portions of the converter module in the 50th stage. That is, two states where the carrier signal is in opposite phases are shown in FIGS. 5 and 8.

It is well known that waveforms at various portions of the conventional two-level converter are as described above and so its detail description is omitted. In brief, three periods of a carrier signal (carrier wave) are placed within the duration of one period (e.g., in a period of 0.02 second from time 0) of a commanded voltage in a voltage waveform whose horizontal axis indicates time. This relationship also holds in the waveform of FIG. 8 where the carrier signal is in opposite phases.

This is demonstrated with the pulse waveforms shown in the middle stages of FIGS. 5 and 8. Three pulses are generated within the duration of one period (e.g., in a period of 0.02 second from time 0) of a commanded voltage. This means that the frequency of command pulses is three times higher than the frequency of the system voltage (commanded voltage).

Figure 6:
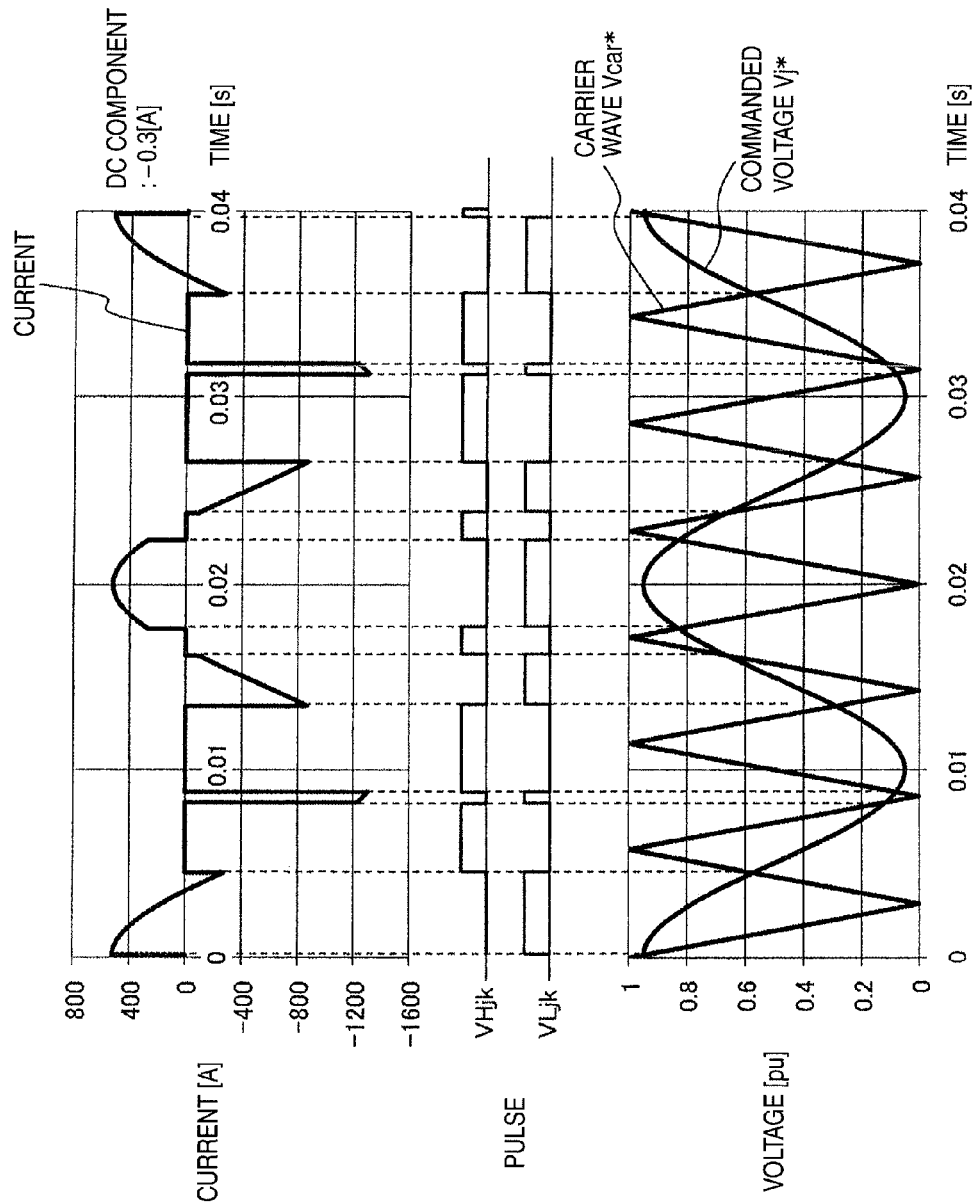
FIG. 6 is a diagram of current waveforms through the capacitor in the cell located in the 100th stage of the lower arm for R-phase when 3.5 pulses are produced.
Figure 9:
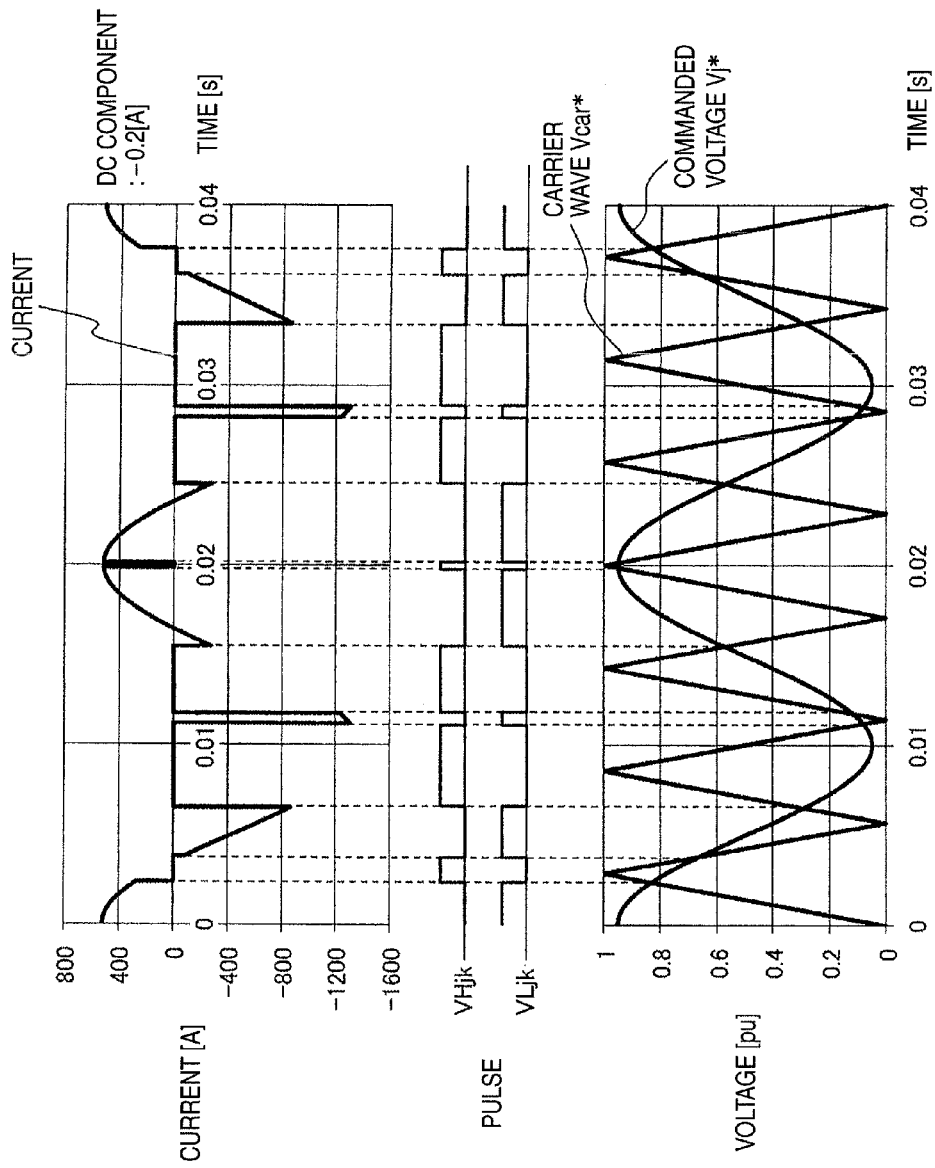
FIG. 9 is a diagram of current waveforms through the capacitor in the cell located in the 50th stage of the lower arm for R-phase when 3.5 pulses are produced.

Carrier arm voltage waveform and the waveforms of capacitor current and its DC component produced where the number of pulses p=3.5 are shown in FIGS. 6 and 9. FIGS. 5 and 8 are identical in conditions with FIGS. 6 and 9 except that the number of pulses p=3.5 in FIGS. 6 and 9. It is obvious that p=3.5 (number of pulses) in FIGS. 6 and 9 because 7 periods of a carrier signal (carrier wave) are placed within the duration of 2 periods (e.g., in a period of 0.04 second from time 0) of a commanded voltage in a voltage waveform whose horizontal axis indicates time.

This is demonstrated with the pulse waveforms shown in the middle stages of FIGS. 6 and 9. Seven pulses are generated in the duration of 2 periods (e.g., in a period of 0.04 second from time 0) of a commanded voltage. This means that the frequency of command pulses is 3.5 times higher than the frequency of the system voltage (commanded voltage).

The upper part of each of FIGS. 5, 6, 8, and 9 shows the waveform of a capacitor current and the waveform of its DC component, while the lower part shows the waveform of a carrier arm voltage. The relationship between the commanded voltage and carrier wave in the lower part is set forth under the same conditions for both the conventional technique and the present invention as described above. The resulting waveform of the capacitor current and the waveform of its DC component in the upper part are different greatly.

For example, in the conventional case of FIG. 5, the DC component of the current flowing through the capacitor is +57 (A). The DC component of the current flowing through the capacitor of FIG. 8 where the carrier signal is in the opposite phase is −66 (A). As in this example, the absolute value of the DC component is large. In addition, current differences are produced among individual cells.

In short, in the conventional technique, the DC component of the current flowing through a capacitor differs greatly among cells (converter modules) and produces variations. As a result, the capacitor voltage continues to increase or decrease. This problem would be solved by supplying a circulating current. However, there is the problem that the circulating current increases and it becomes difficult to control the current.

Incidentally, in the example of the present invention of FIG. 6, the DC component of the current flowing through a capacitor is −0.3 (A). The DC component of the current flowing through a capacitor of FIG. 9 where the carrier signal is in the opposite phase is −0.2 (A). As in this example, the absolute value of the DC component is small. In addition, currents flowing through individual cells are almost uniform.

Figure 7:
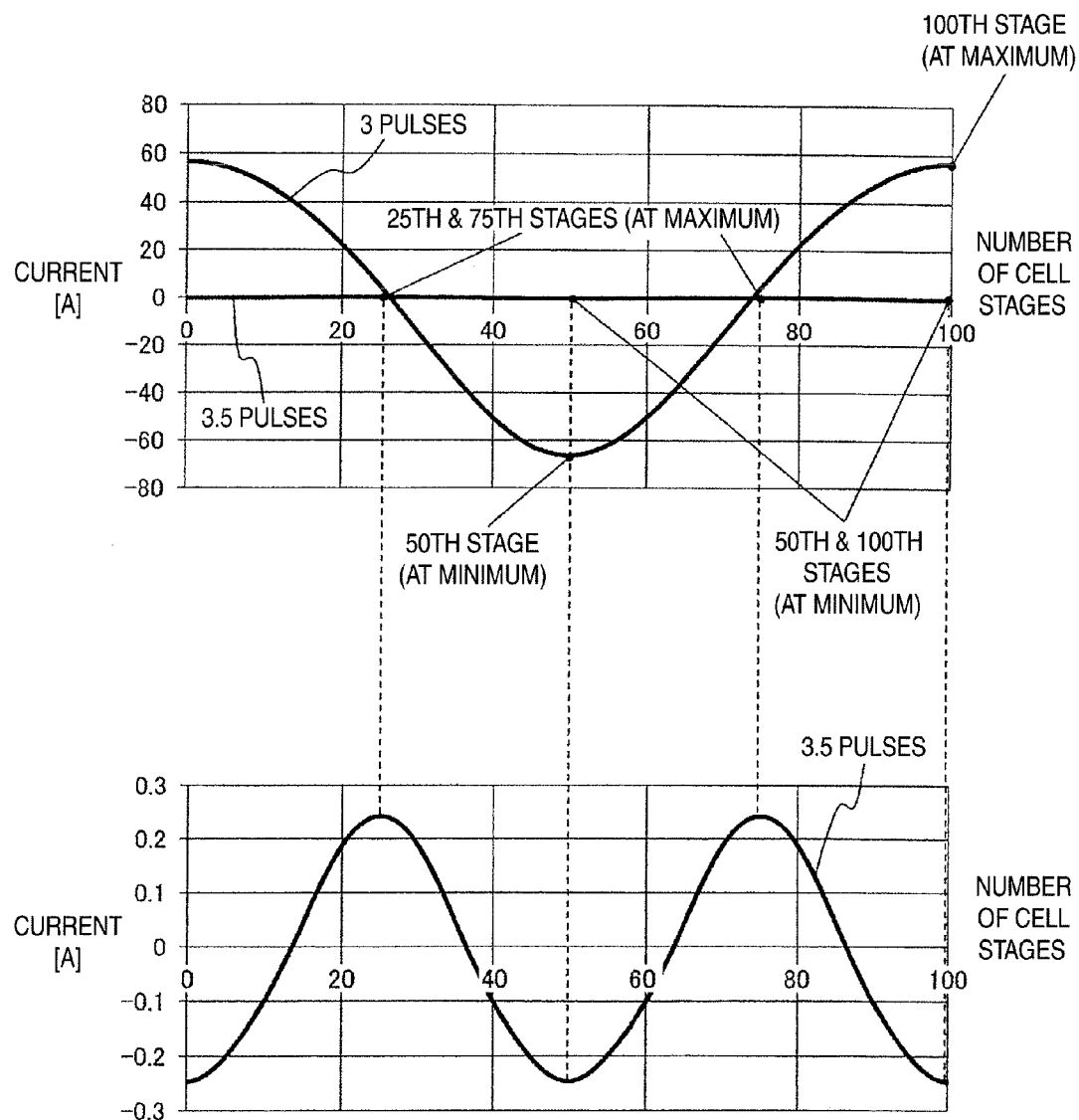
FIG. 7 is a diagram showing DC components of capacitor currents.

In the above description, variations in the DC component of current flowing through a capacitor are described while taking the cell in the 50th stage and the cell in the 100 stage as examples. Variations among the currents flowing through arbitrary stages of cells are collectively shown in FIG. 7. In FIG. 7, the number of stages of cells is plotted on the horizontal axis, while the DC component of capacitor current through each cell is plotted on the vertical axis in a case where the number of stages of cells is set to 100. In this example of tentative computation, a case where Idc=1280 [A], VDC=250 [kV], d-axis voltage is 138 [kV], and d-axis current is 2319 [A].

The upper part of FIG. 7 shows the results of an analysis of the conventional technique. This shows that an average current of 57 [A] continues to flow into the cell in the 100th stage, while an average current of −66 [A] continues to flow into the cell in the 50th stage. Currents between these maximum and minimum values flow into or out of cells in the intermediate stages.

As described previously, a solution to this is to supply a circulating current common to all the arms such that the individual capacitors are balanced in terms of current. For this solution, all the currents are preferably have the same sign. However, the results of the analysis indicate that a large value of circulating current is needed for control that achieves the balanced condition because the currents have different signs. The effective value of the AC component is 249 [A]. In contrast, a DC component which is 27% at maximum flows.

In contrast, the lower part of FIG. 7 shows the results of an analysis made using the technique of the present invention. This indicates that the magnitudes of, and variations among, the DC components of capacitor currents through cells can be suppressed greatly. For example, when the number of pulses p=3.5, the DC component is −0.3 to 0.3 [A] and can be suppressed to 0.1% at maximum of the effective value of the AC component.

In the present embodiment, the case where the number of pulses p=3.5 has been described. Equivalent effects can be obtained if the number of pulses is other half-integers such as 2.5, 4.5, or 5.5. In essence, the number of pulses gives odd-numbered n pulses within two periods of a commanded voltage. The advantageous effects of the present invention are obtained where n is an odd number that is equal to or greater than 5.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for use with a voltage source converter, comprising:
legs each of which is configured by a plurality of converter modules each having a capacitor, wherein
each of said legs has a first terminal on a positive side and a second terminal on a negative side,
said control apparatus is configured to create command pulses for operating the converter modules,
the at least one of the plurality of converter modules has a switching device,
controlling of the switching device causes electrical energy to travel into and out of the capacitor via the first and second terminals,
connecting of the first and second terminals causes at least some of the plurality of converter modules to be connected in series,
a frequency of the command pulses is a non-integer multiple of a frequency of a system voltage so as to reduce a respective difference, for respective converter modules, of voltages charged in the capacitor of the plurality of converter modules, and
twice of the frequency of the command pulses is an integer multiple of the frequency of the system voltage.

2. The control apparatus according to claim 1, wherein the frequency of the command pulses is 3.5 times higher than the frequency of the system voltage.

3. The control apparatus according to claim 1, wherein each leg has arms, and converter modules are disposed on the arms.

4. The control apparatus according to claim 1, wherein a portion of a respective arm is configured to be a terminal and is connected to another portion of the respective arm.

5. The control apparatus according to claim 1, wherein the arms are connected to each other to perform power conversion.

6. The control apparatus according to claim 1, wherein the command pulses are calculated by a PWM (pulse-width modulation) method using a PWM carrier wave made of a triangular wave.

7. The control apparatus according to claim 6, wherein the frequency of the command pulses is 3.5 times higher than the frequency of the system voltage.

8. A method of controlling a voltage source converter, the method comprising:
creating command pulses, the command pulses having a frequency that is a non-integer multiple of a frequency of a system voltage, wherein the voltage source converter comprises
legs each of which is configured by a plurality of converter modules, each of the plurality of converter modules having a capacitor, wherein each of said legs has a first terminal on a positive side and a second terminal on a negative side, and the command pulses operate the plurality of converter modules, wherein the at least one of the plurality of converter modules has a switching device, controlling of the switching device causes electrical energy to travel into and out of the capacitor via the first and second terminals, connecting of the first and second terminals causes at least some of the plurality of converter modules to be connected in series, the frequency of the command reduces a respective difference, for respective converter modules, of the voltages charged in the capacitor of the plurality of converter modules, and twice of the frequency of the command pulses is an integer multiple of the frequency of the system voltage.

9. The method according to claim 8, wherein the frequency of the command pulses is 3.5 times higher than the frequency of the system voltage.

10. The method according to claim 8, wherein the command pulses are provided in response to a result of a comparison between a commanded voltage and a carrier wave in such a way that 5 or more odd-numbered carrier waves are placed in a duration of two periods of the commanded voltage.

11. The method according to claim 8, wherein each leg has arms, and converter modules are disposed on the arms.

12. The method according to claim 8, wherein a portion of a respective arm is configured to be a terminal and is connected to another portion of the respective arm.

13. The method according to claim 8, wherein the arms are connected to each other to perform power conversion.

14. The method according to claim 8, wherein the command pulses are calculated by a PWM (pulse-width modulation) method using a PWM carrier wave made of a triangular wave.

15. The method according to claim 14, wherein the frequency of the command pulses is 3.5 times higher than the frequency of the system voltage.

16. A control apparatus for use with a voltage source converter, comprising:

legs each of which is configured by a plurality of converter modules each having a capacitor, wherein each of said legs has a first terminal on a positive side and a second terminal on a negative side, said control apparatus is configured to create command pulses for operating the converter modules, the at least one of the plurality of converter modules has a switching device, controlling of the switching device causes electrical energy to travel into and out of the capacitor via the first and second terminals, connecting of the first and second terminals causes at least some of the plurality of converter modules to be connected in series, a frequency of the command pulses is a non-integer multiple of a frequency of a system voltage so as to reduce a respective difference, for respective converter modules, of voltages charged in the capacitor of the plurality of converter modules, and the frequency of the command pulses is 3.5 times higher than the frequency of the system voltage.

17. A method of controlling a voltage source converter, the method comprising:

creating command pulses, the command pulses having a frequency that is a non-integer multiple of a frequency of a system voltage, wherein the voltage source converter comprises legs each of which is configured by a plurality of converter modules, each of the plurality of converter modules having a capacitor, wherein each of said legs has a first terminal on a positive side and a second terminal on a negative side, and the command pulses operate the plurality of converter modules, wherein the at least one of the plurality of converter modules has a switching device, controlling of the switching device causes electrical energy to travel into and out of the capacitor via the first and second terminals, connecting of the first and second terminals causes at least some of the plurality of converter modules to be connected in series, the frequency of the command reduces a respective difference, for respective converter modules, of the voltages charged in the capacitor of the plurality of converter modules, and the frequency of the command pulses is 3.5 times higher than the frequency of the system voltage.

* * * * *